United States Patent
Wang et al.

(10) Patent No.: US 10,567,787 B1
(45) Date of Patent: Feb. 18, 2020

(54) AUTOFOCUSING IMAGES USING MOTION DETECTION

(71) Applicant: Apple, Inc., Cupertino, CA (US)

(72) Inventors: Muge Wang, San Jose, CA (US); D. Amnon Silverstein, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 50 days.

(21) Appl. No.: 16/100,809

(22) Filed: Aug. 10, 2018

(51) Int. Cl.
*H04N 19/513* (2014.01)
*G06T 3/00* (2006.01)
*G06T 5/00* (2006.01)
*H04N 19/176* (2014.01)

(52) U.S. Cl.
CPC ......... *H04N 19/513* (2014.11); *G06T 3/0006* (2013.01); *G06T 5/002* (2013.01); *H04N 19/176* (2014.11)

(58) Field of Classification Search
USPC .................................................... 375/240.16
See application file for complete search history.

(56) References Cited

U.S. PATENT DOCUMENTS

| 7,428,375 B2 * | 9/2008 | Yost ................... | H04N 5/23212 348/208.14 |
| 9,282,235 B2 | 3/2016 | Lindskog et al. | |
| 9,477,138 B2 | 10/2016 | Brunner et al. | |
| 2011/0103679 A1 * | 5/2011 | Campbell .......... | G01B 11/0608 382/152 |
| 2012/0092488 A1 * | 4/2012 | Delaney ............. | G01B 11/0608 348/128 |
| 2015/0350522 A1 * | 12/2015 | Lindskog ........... | H04N 5/23212 348/349 |
| 2017/0006211 A1 * | 1/2017 | Gurbuz ................ | H04N 5/2226 |
| 2018/0293735 A1 * | 10/2018 | Li ............................ | G06T 7/194 |

OTHER PUBLICATIONS

Tsai, T. et al., "A New Auto-Focus Method based on Focal Window Searching and Tracking Approach for Digital Camera," ISCCSP, Mar. 12-14, 2008, pp. 650-653.

* cited by examiner

*Primary Examiner* — Behrooz M Senfi
(74) *Attorney, Agent, or Firm* — Fenwick & West LLP

(57) ABSTRACT

Embodiments of the present disclosure relate to autofocusing of images using motion vectors generated by an image signal processor of a device. An image being processed may include one or more motion detection windows associated with a motion vector as well as one or more autofocus windows. An autofocus window that follows a motion detection window by at least a threshold vertical distance may be selected, for example, to account for a period of time or latency for determining a motion vector of the motion detection window. The device may perform autofocusing by shifting location of the selected autofocus window.

20 Claims, 11 Drawing Sheets

AUTOFOCUSING IMAGES USING MOTION DETECTION

BACKGROUND

1. Field of the Disclosure

The present disclosure relates a circuit and methods for processing images and more specifically for autofocusing images using motion estimation.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to motion estimation and autofocusing of images. An image signal processor may determine statistics of pixels of an image to generate a motion vector. Pixel values of a current image may be compared with pixel values of a prior image to determine shift between the images. The motion vector may indicate information associated with a property of an image such as an amount of rotation or shift in a horizontal direction and a vertical direction.

In one embodiment, the motion vector can be used to assist autofocusing of an image. The motion vector may be determined by accumulating pixel values of a motion detection window of an image. The image may also include one or more autofocus windows. If it is determined that a given one of the autofocus windows follows the motion detection window by at least a threshold vertical distance, at least one property of the autofocus window may be adjusted according to at least the current motion vector. In some embodiments, adjusting the at least one property of the autofocus window includes shifting a horizontal or vertical location of the autofocus window to compensate for detected motion in the motion detection window.

In some embodiments, a vertical directional shift and horizontal directional shift is identified using cross-correlation scores of pixel values of the current and prior images, which are processed by a vector correlation analysis circuit. A statistics circuit may include summation circuits for adding pixel values in rows or columns of the current image.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to autofocusing of images using motion vectors generated by an image signal processor of a device. An image being processed may include one or more motion detection windows associated with a motion vector as well as one or more autofocus windows. An autofocus window that follows a motion detection window by at least a threshold vertical distance may be selected, e.g., to account for a period of time (or latency) for determining a motion vector of the motion detection window. The device may perform autofocusing by shifting location of the selected autofocus window.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
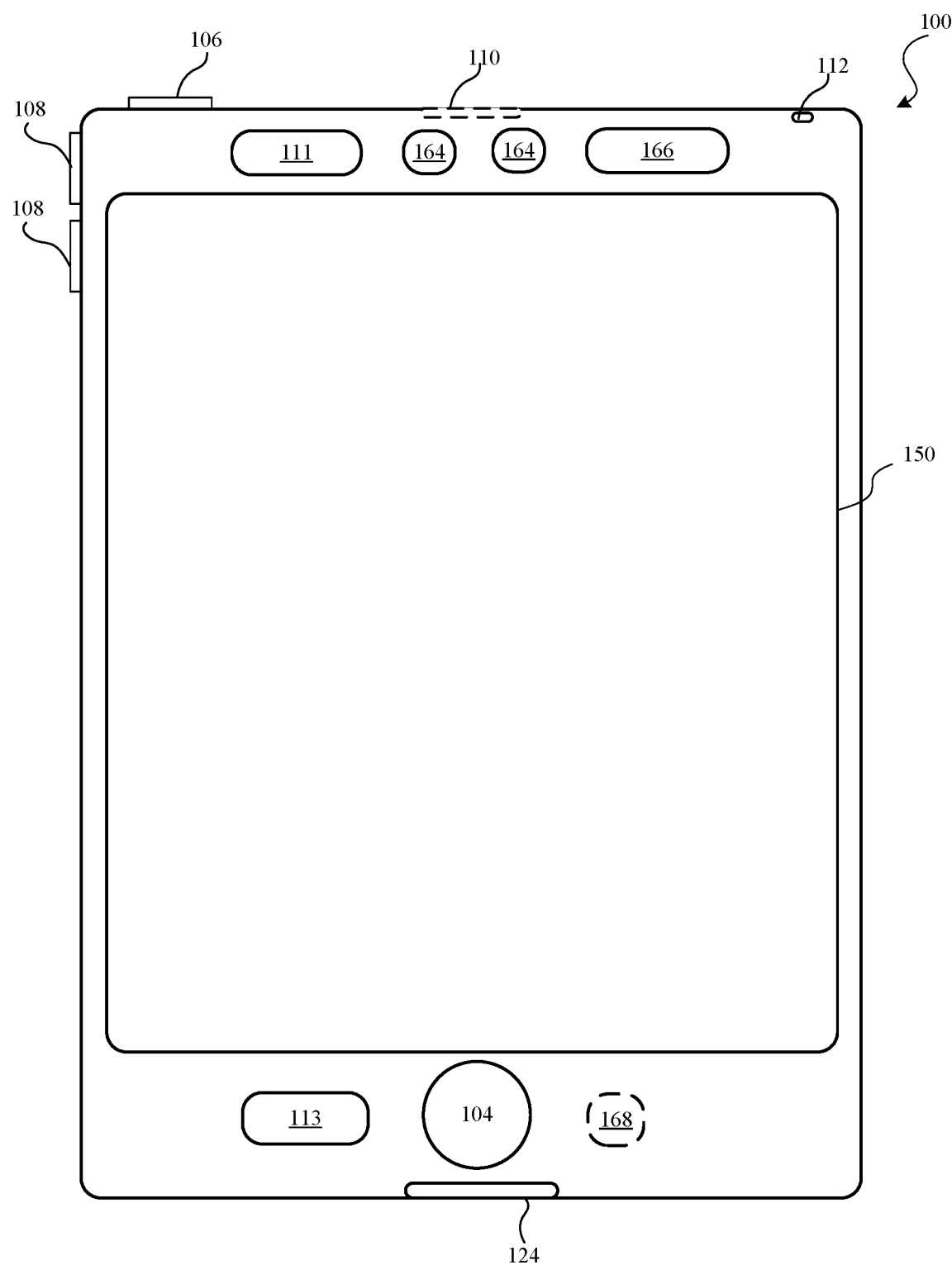
FIG. 1 is a high-level diagram of an electronic device, according to one embodiment

FIG. 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
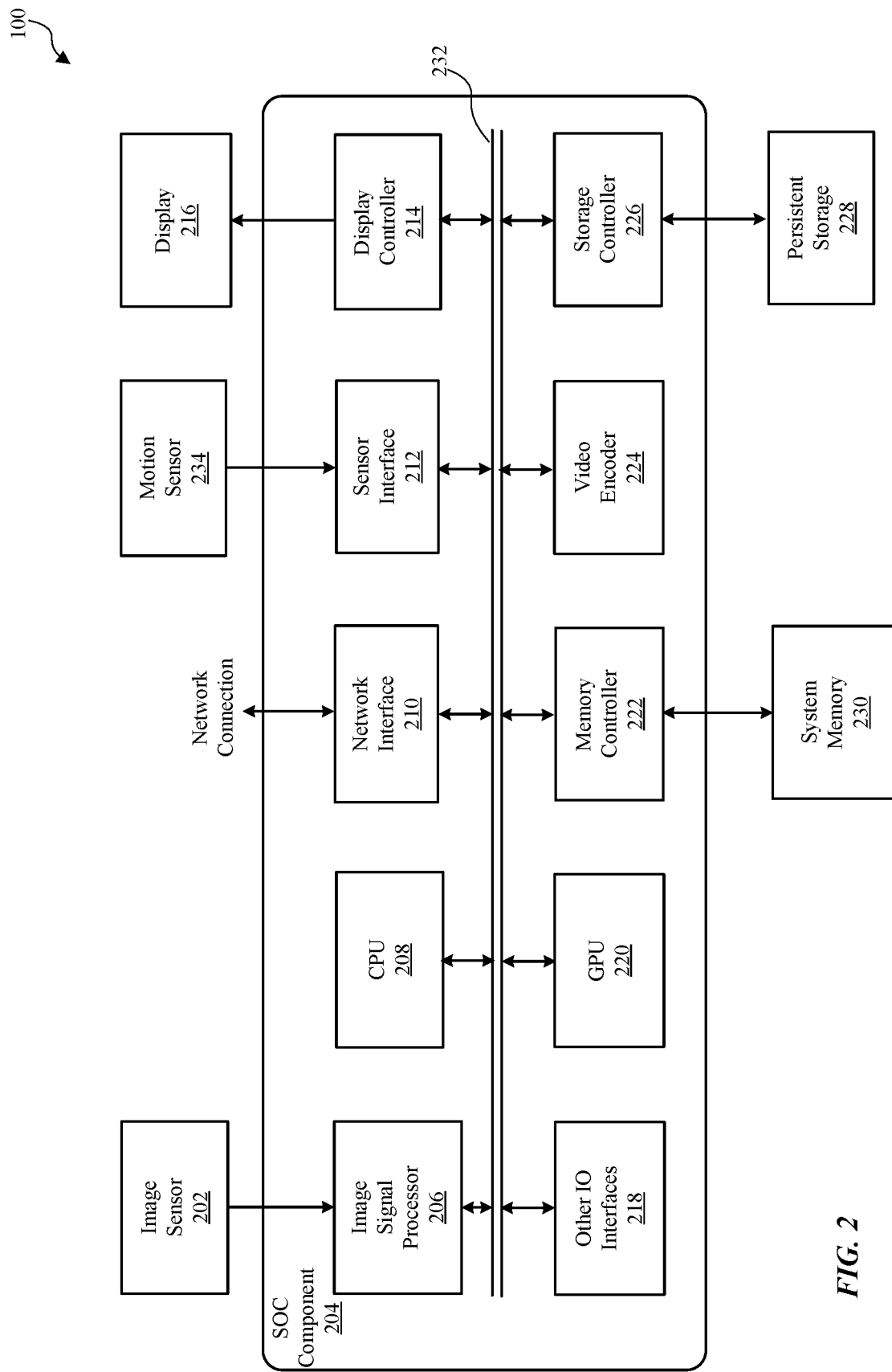
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAIVIBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs.

In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface w10 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
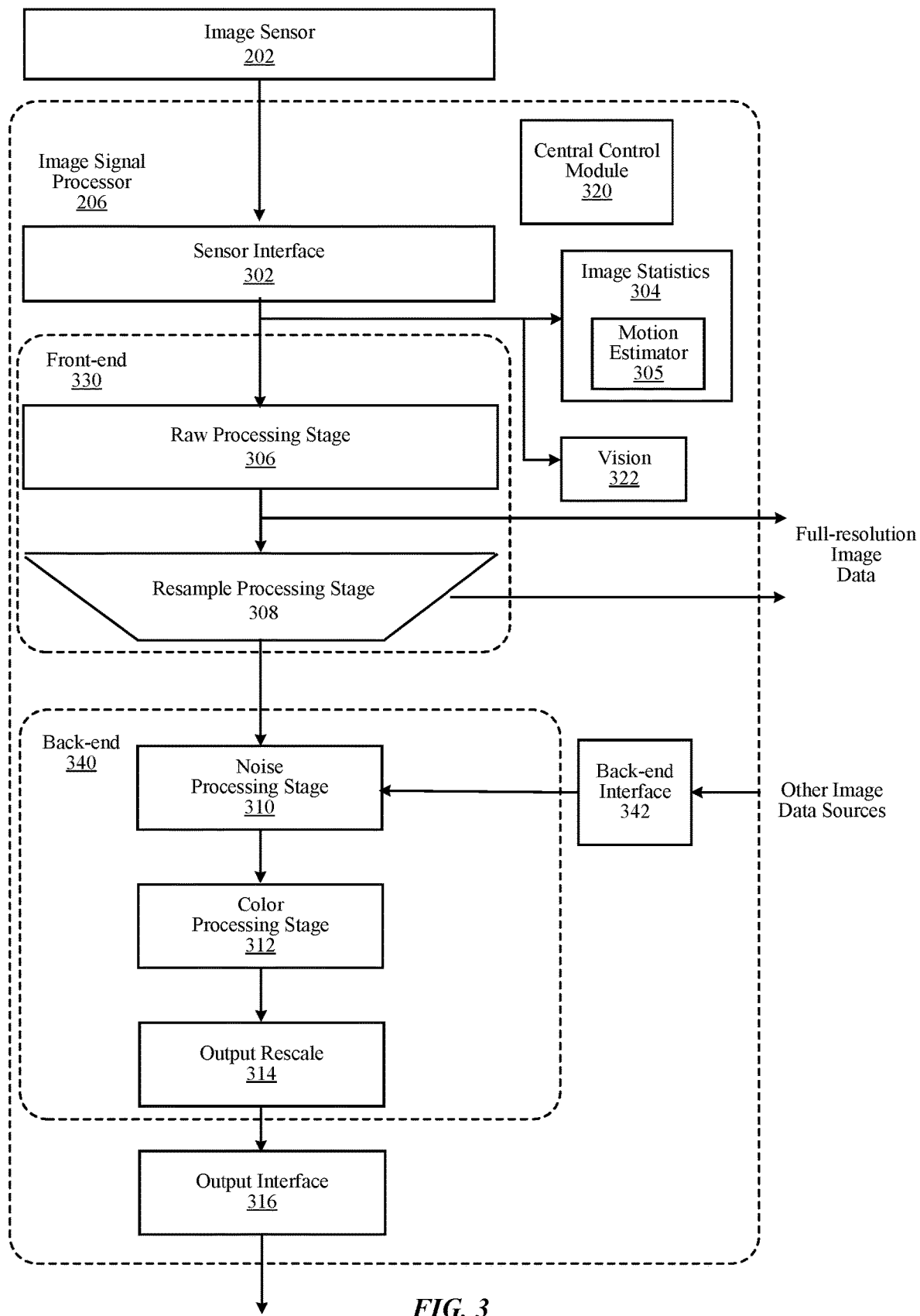
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control module 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values.

Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform gamma correction. For the purpose of Gamma mapping, lookup tables (or other structures that index pixel values to another value) for different color components or channels of each pixel (e.g., a separate lookup table for R, G, and B components) may be used. Color space conversion refers to converting color space of an input image data into a different format. In one embodiment, resample processing stage 308 converts RGB format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, replace patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), autofocus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. The image statistics module 304 includes a motion estimator 305, which may generate image statistics for autofocusing of images (e.g., performed in software and/or hardware). The motion estimator 305 is further described below with reference to FIG. 4. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing camera pose and object tracking. Keypoint detection refers to the process of identifying such keypoints in an image. HOG provides descriptions of image patches for tasks in mage analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross correlation between a patch of image and a kernel.

Back-end interface 342 receives image data from other image sources than image sensor 202 and forwards it to other components of ISP 206 for processing. For example, image data may be received over a network connection and be stored in system memory 230. Back-end interface 342 retrieves the image data stored in system memory 230 and provides it to back-end pipeline stages 340 for processing. One of many operations that are performed by back-end interface 342 is converting the retrieved image data to a format that can be utilized by back-end processing stages

340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform gamma correction or reverse gamma correction. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In some embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame and thus the reference frame is not spatially filtered).

Color processing stage 312 may perform various operations associated with adjusting color information in the image data. The operations performed in color processing stage 312 include, but are not limited to, local tone mapping, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between a input image data and output image data in order to correct artifacts and motion caused by sensor motion during the capture of the image frame. Output rescale may provide image data via output interface 316 to various other components of device 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Motion Estimator

Figure 4:
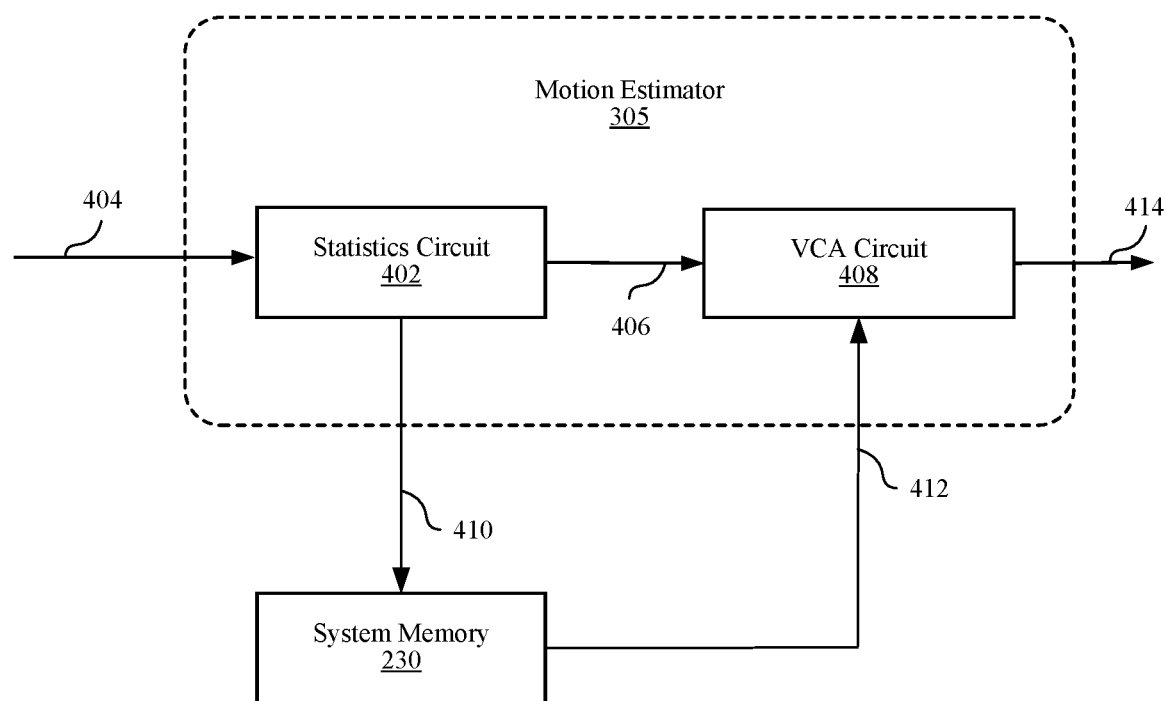
FIG. 4 is a block diagram illustrating a motion estimator, according to one embodiment.

FIG. 4 is a block diagram illustrating a motion estimator 305, according to one embodiment. The motion estimator 305 processes images to determine statistics such as shift between images in a horizontal or vertical direction. Additionally, the motion estimator 305 may use the statistics to generate motion vectors, for example, to be used for autofocusing. The motion estimator 305 may include, among other components, statistics circuit 402 and vector correlation analysis (VCA) circuit 408.

In the embodiment of FIG. 4, statistics circuit 402 receives input image data 404 captured by the image sensor 202. The input image data 404 may be provided by the sensor interface 302 or received from a source memory (e.g., system memory 230, persistent storage 228, or a cache) of the device 100. The input image data 404 may have one or multiple color components or channels. In some embodiments, the image sensor 202 captures images using a Bayer filter including color filters for red, green, and blue. The input image data 404 may include color components for a red, red subtype of green ("Gr"), blue, and blue subtype of green ("Gb"). The color components may be arranged in any suitable order (e.g., GRBG, RGGB, BGGR, GBRG, etc.). In addition, the statistics circuit 402 can divide (e.g., a window of) the input image data 404 into blocks of pixels in the vertical and horizontal directions, e.g., where the blocks are adjacent to each other and/or do not overlap each other. In some embodiments, dimensions of the blocks may be even integer numbers, and the dimensions of the blocks may be at least four pixels.

The statistics circuit 402 generates image statistics such as row sums and column sums of pixel values (e.g., intensity values) of the input image data 404. A row sum represents a sum of pixel values across a row of pixels in one or more blocks of an image. A column sum represents a sum of pixel values across a column of pixels in one or more blocks of an image. In some embodiments, the output of the statistics circuit 402 can be used to detect fixed pattern noise in images. The statistics circuit 402 may determine the sums by accumulating pixel values across a row or column of pixel values for each block of the input image data 404. The pixel values may be accumulated for specific color components, and the statistics circuit 402 can apply weighted sums of multiple color components.

The statistics circuit 402 provides generated image statistics 406 to the VCA circuit 408 to perform further image processing. The image statistics 406 provided to the VCA circuit 408 may include statistics that are weighted summation of multiple color components. The statistics circuit 402 can store image statistics 410 or other relevant information to the system memory 230 via direct memory access. The image statistics 410 stored to system memory 230 may be for a particular color component, for example, so that image statistics for red, green, and blue are stored separately instead of being summed to a single component. Since direct memory access operates independently from the CPU 208, the motion estimator 305 may offload resource intensive operations or other overhead associated with the motion estimation or autofocusing operations from the CPU 208. The statistics circuit 402 is further described below with respect to FIG. 5.

The VCA circuit 408 generates a motion vector using the image statistics 406 received from the statistics circuit 402. The motion vector indicates estimated motion of a current image relative to a prior image upon which the prior image statistics is based. As an example, the current and prior images each capture an image of an entity such as a person or an object. There may be shifting of the entity (and/or of the device 100) or movements of objects in images during a period of time between capturing of the current and prior images. The device 100 can use the motion vector to compensate for the estimated motion, which may improve quality or other attributes of the current image. In some embodiments, the VCA circuit 408 can enable detection for one of the horizontal or vertical directions and disable correction for the other direction, or enable detection for both directions.

The VCA circuit 408 generates motion vectors using cross-correlation scores. The VCA circuit 408 determines cross-correlation scores by cross-correlating sums of pixel values of a current image and those of a prior image. The sums of pixel values of the current image may be referred to herein as vectors, and the sums of pixel values of the prior image may be referred to herein as reference vectors. Sums of rows of pixel values represent a vertical directional vector, and cross-correlation scores between vertical directional vectors of current image and a prior image represents a vertical directional shift. Likewise, sums of columns of pixel values represent a horizontal directional vector, and cross-correlation scores between horizontal directional vectors of current image and a prior image represents a horizontal directional shift. In some embodiments, the VCA circuit 408 may implement normalized cross-correlation (NCC).

The VCA circuit 408 may retrieve vectors of current images from the image statistics 406. Further, the VCA circuit 408 may retrieve reference vectors 412 from system memory 230 via direct memory access (DMA) or from a register. The reference vectors 412 may be previously generated by the statistics circuit 402 and may be modified in front end processing. For instance, the VCA circuit 408 performs one or more of (in any particular order): compressing data size of vectors, cropping vectors (e.g., shorten vectors to a target length), performing spatial binning, determining a weighted sum of multiple color components, applying offset and scaling factors to vector values, or performing gamma correction or non-linear transformation. In some embodiments, the VCA circuit 408 uses a look up table (LUT) for transforming values of a reference vector to reduce the impact of noise, boost responsivity of dark areas, or equalize a signal-to-noise ratio. In addition, the VCA circuit 408 may perform normalization to compensate for changes in lighting, e.g., exposure or white balance. The VCA circuit 408 may use spatial binning to reduce vector size and thus reduce processing time. A vector of a current image may also be modified in front end processing using one or more of the above mentioned techniques.

The VCA circuit 408 may provide the motion vector 414 to other components of the ISP 206 or SOC component 204 for further processing. For example, the CPU 208 may use the motion vector 414 to perform autofocusing operations, which is further described below with reference to FIG. 9.

Example Statistics Circuit

Figure 5:
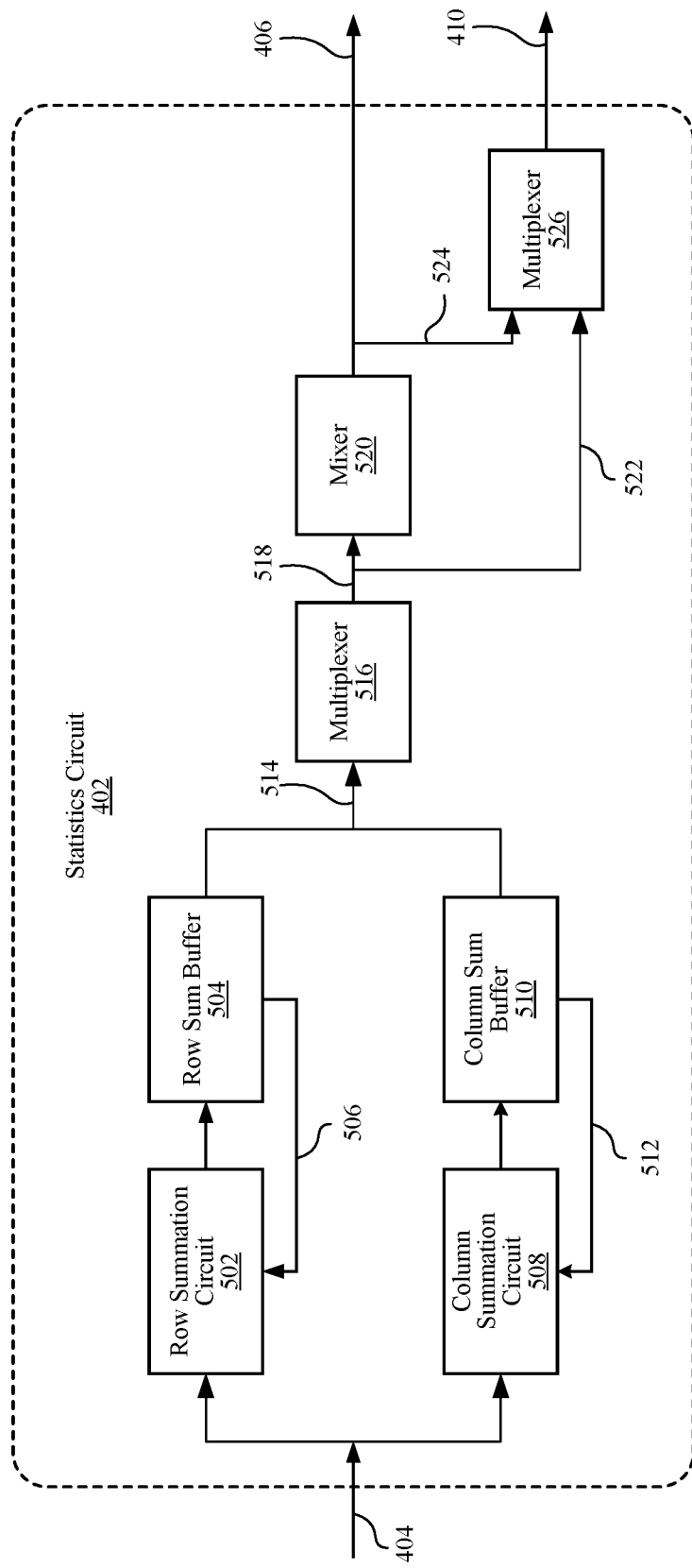
FIG. 5 is a block diagram illustrating a pipeline of the statistics circuit, according to one embodiment.

FIG. 5 is a block diagram illustrating a pipeline of the statistics circuit 402, according to one embodiment. The statistics circuit 402 may include, among other components, row summation circuit 502, row sum buffer 504, column summation circuit 508, column sum buffer 510, first multiplexer 516, mixer 520, and second multiplexer 526.

The row summation circuit 502 and the column summation circuit 508 receive image data 404 input to the statistics circuit 402. The row summation circuit 502 determines row sums of an image, for example, by adding pixel values in the same row position across columns of blocks of an image, as described below with reference to FIG. 6. The row sum buffer 504 receives and stores values 506 of row sums or intermediate row sums. In particular, the row sum buffer 504 buffers the values as the row summation circuit 502 iterates across rows of the blocks to accumulate pixel values.

The column summation circuit 508 determines column sums of the image, for example, by adding pixel values in the same column position across rows of blocks of the image, as described below with reference to FIG. 7. The column sum buffer 510 receives and stores values 512 of column sums or intermediate column sums. In particular, the column sum buffer 510 buffers the values as the column summation circuit 508 iterates across columns of the blocks to accumulate pixel values. In various embodiments, the column summation circuit 508 and row summation circuit 502 determine sums of pixel values separately for different color components.

The first multiplexer 516 has an input coupled to the row sum buffer 504 and another input coupled to the column sum buffer 510 to receive accumulated sums 514 of pixel values from the buffers. Particularly, the first multiplexer 516 receives row sums and column sums from the row sum buffer 504 and the column sum buffer 510, respectively. The first multiplexer 516 selectively forwards the row sums and the column sums to the mixer 520 or the second multiplexer 526.

The mixer 520 is coupled to the row summation circuit 502 and the column summation circuit 508, e.g., through the first multiplexer 516. Accumulated sums received by the mixer 520 from the summation circuits may be associated with one given color component. The mixer 520 determines a weighted sum of (or "mixes") row sums of pixel values and column sums of pixel values of multiple color components. The mixer 520 can output the sums as image statistics 406 and can also provide the sums to the second multiplexer 526. The second multiplexer 526 selects between outputs of the first multiplexer 516 and the mixer 520 for storage using DMA. For instance, the second multiplexer 526 stores image statistics 410 for separate color components or a weighted sum of color components to system memory 230 or to registers.

In some embodiments, the first multiplexer 516 or the second multiplexer 526 may select outputs as indicated by parameter values retrieved from one or more registers. A parameter value may indicate that output to the VCA circuit 408 is enabled (e.g., an enable bit or flag). Additionally, a parameter value may indicate information for operation of the statistics circuit 402 or the VCA circuit 408, for instance, a number of windows to be processed for an image, a number of blocks, a number of columns or rows, size of vectors, or color component configuration of an image (e.g., weights of R, Gr, B, and Gb for the mixer 520).

Example Sums of Pixel Values of Blocks

Figure 6:
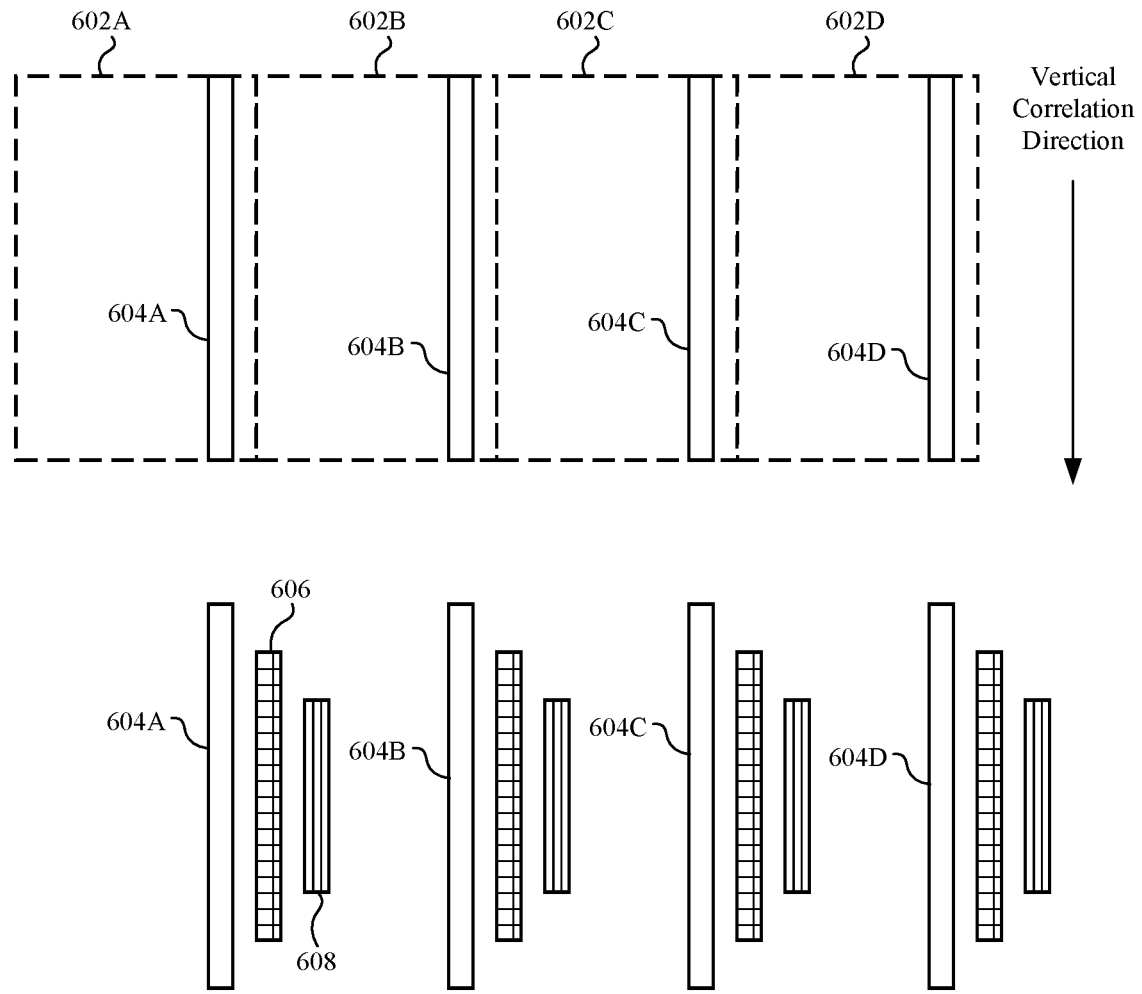
FIG. 6 is a diagram of row sums of blocks of an image, according to one embodiment.
Figure 7:
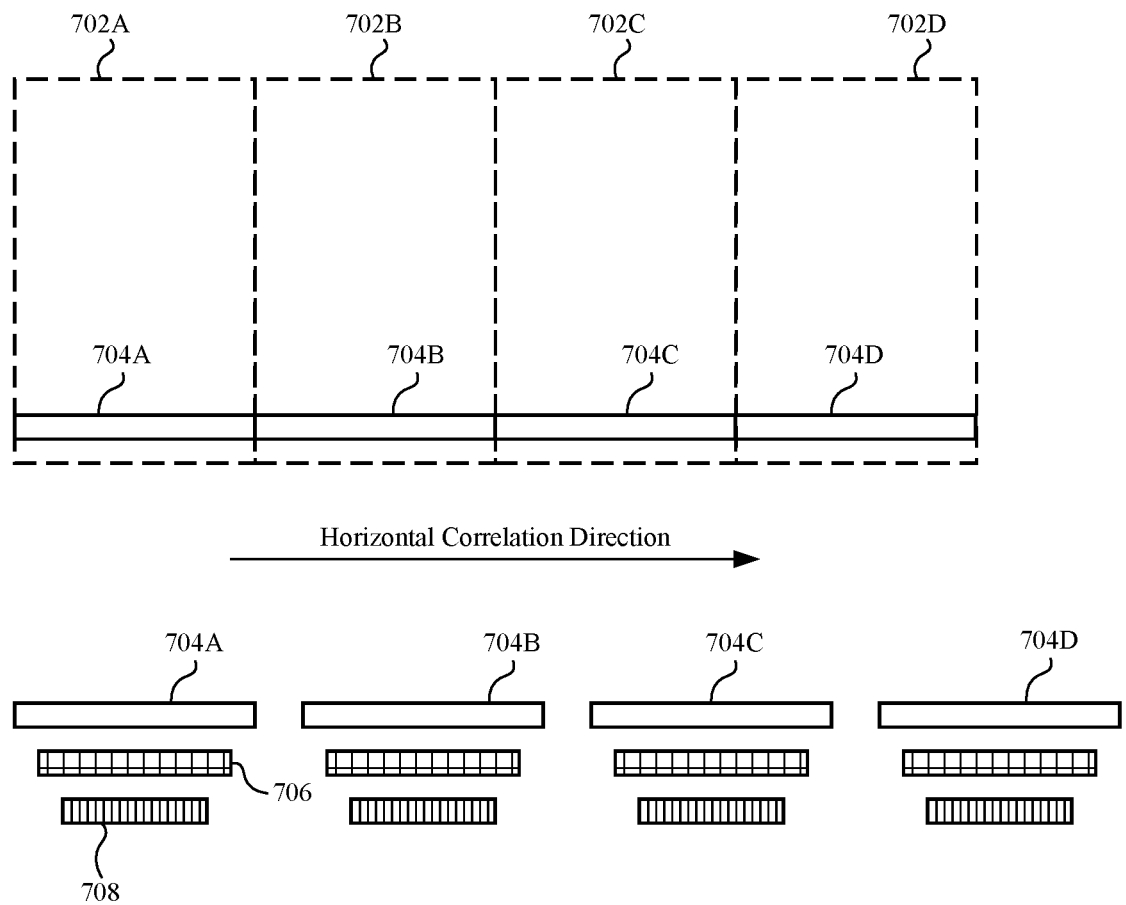
FIG. 7 is a diagram of column sums of blocks of an image, according to one embodiment.
Figure 8:
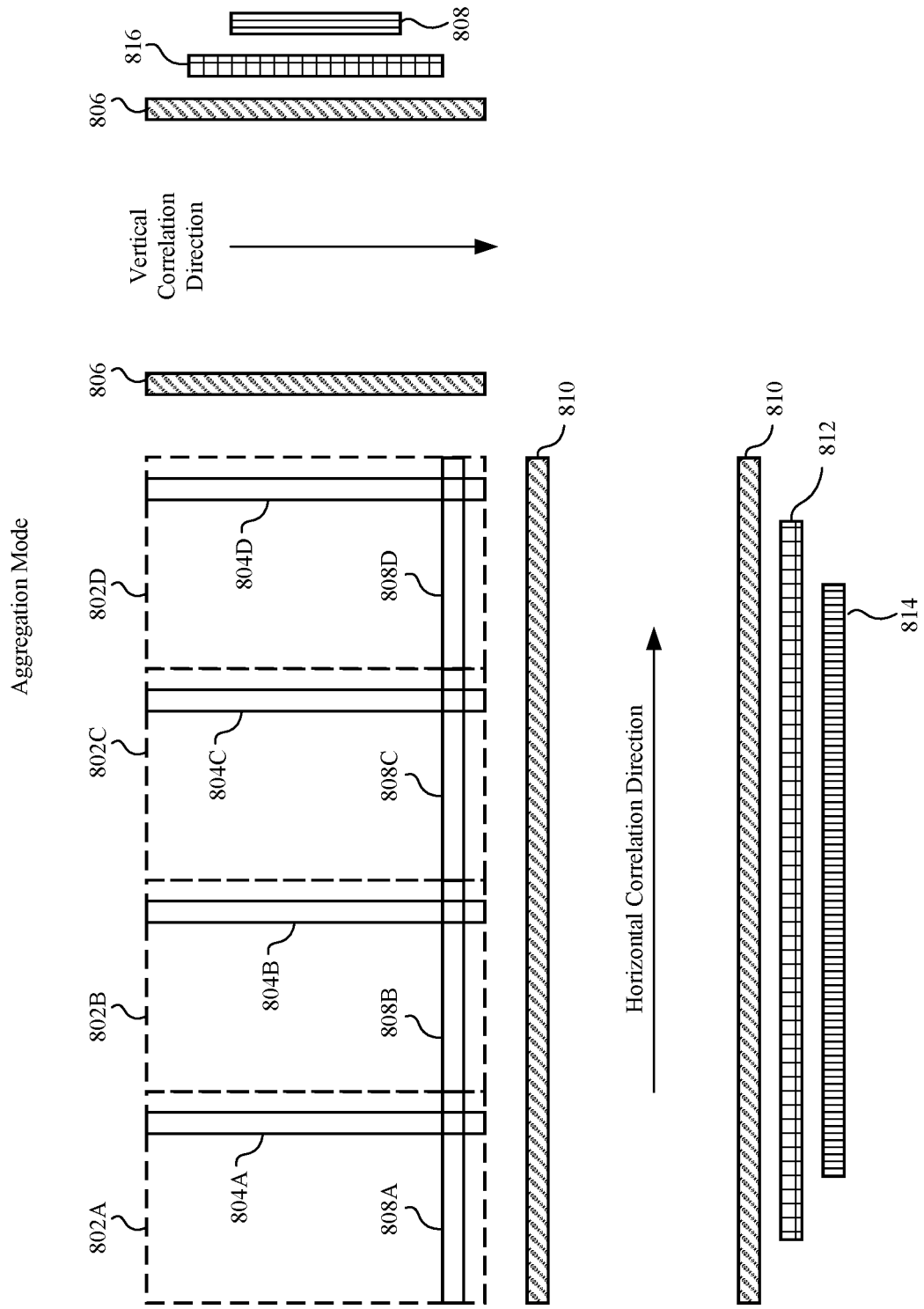
FIG. 8 is a diagram of aggregated sums of blocks of an image, according to one embodiment.

FIGS. 6 through 8 illustrate accumulation of sums of pixel values of a window (e.g., a motion detection window) of an image 902. In the examples illustrated in FIGS. 6 through 8, a window of a current image is divided into a row of four blocks that are identical in dimension. Windows may be a subset of pixels of an image and may be rectangular-shaped. Since the blocks have identical dimensions, the blocks have a same number of rows and columns of pixels. In other embodiments, the motion estimator 305 may divide windows into any number of blocks arranged in any number of rows or columns.

In a sub-window mode, the statistics circuit 402 accumulates column sums and row sums for each block. Additionally, the VCA circuit 408 determines cross-correlation scores for each column sum and row sum of a block of the window with those from a prior image. In some embodiments, the VCA circuit 408 generates a motion vector for the window of the current image by determining a greatest one of the cross-correlation scores. For example, the greatest correlation score corresponds to the best estimation of vertical shift or horizontal shift detected by the motion estimator 305 across the blocks in the window. A window used for generating motion vectors may be referred to herein as a motion detection window. The VCA circuit 408 may generate other motion vectors having different values for other windows of a same image. For instance, a motion vector of a first window capturing an image of a moving object will result in greater amounts of shift than another motion vector of a second window capturing an image of a stationary object. The VCA circuit 408 may write motion vectors or associated values to one or more registers.

FIG. 6 is a diagram of row sums of blocks of an image, according to one embodiment. In the illustrated example, the statistics circuit 402 determines row sums 604A, 604B, 604C, and 604D for block 602A, 602B, 602C, and 602D, respectively. The VCA circuit 408 performs cross-correlation in a vertical correlation direction using vectors of the row sums 604A-D and reference vectors of a prior image. In particular, the VCA circuit 408 correlates each of the vectors with a reference vector determined by adding pixel values of a corresponding segment in the prior image. For example, vector 604A represents a sum of pixel values in the $n^{th}$ column position (iterated over rows of the current image) of the first block of the illustrated window of the current image. Additionally, vector 606 represents a sum of pixel values in the $n^{th}$ column position (iterated over rows of the prior image) of the first block of the same window of the prior image.

Since the size of the vector 604A may be greater than the size of reference vector 606, the VCA circuit 408 may determine whether any pixel values of the vector 604A shifted in the vertical correlation direction relative to pixel values of the reference vector 606. As output of the correlation of vector 604A and reference vector 606, the VCA circuit 408 determines cross-correlation score 608, which corresponds to the correlation score at each vertical directional shift of pixels in the window between the current and prior image at the $n^{th}$ column of the first block, with the greatest score value representing the best estimated vertical directional shift at the $n^{th}$ column between the current and prior image.

FIG. 7 is a diagram of column sums of blocks of an image, according to one embodiment. In the illustrated example, the statistics circuit 402 determines column sums 704A, 704B, 704C, and 704D for block 702A, 702B, 702C, and 702D, respectively. The VCA circuit 408 performs cross-correlation in a horizontal correlation direction using vectors of the column sums 704A-D and reference vectors of a prior image. Cross-correlation of column sums is substantially the same as cross-correlation of row sums, except for the different correlation direction. For instance, the VCA circuit 408 correlates each of the vectors with a reference vector determined by adding pixel values of a corresponding segment (e.g., column) in the prior image. Moreover, the VCA circuit 408 may determine whether any pixel values of the vector 704A shifted in the horizontal correlation direction relative to pixel values of the reference vector 706 because the size of the vector 704A may be greater than the size of reference vector 706.

In various embodiments, the VCA circuit 408 uses peak finding to determine a greatest one of the cross-correlation scores in each of the correlation directions, e.g., horizontal and vertical. If it is determined that a window has multiple maximum cross-correlation scores, the VCA circuit 408 may select the first instance of a greatest score, e.g., corresponding to a vector closest to an origin of a coordinate system of the window. The VCA circuit 408 may also optionally perform sub-pixel location interpolation to obtain sub-pixel precision of the greatest scores. In sub-window mode, the VCA circuit 408 may determine average values or median values of multiple motion vectors of the blocks for a horizontal and vertical component of an overall motion vector of a window. In some embodiments, the average values may be rounded to the nearest integer.

The VCA circuit 408 may use less computational resources to calculate motion vectors using the embodiments described herein, in comparison to conventional motion detection methods. Convention methods can require comparison of a greater number of pixels between a current image and reference image by scanning across all pixels of the images, which can be time-consuming and introduce more latency. By dividing images into blocks for determining image statistics, the motion estimator 305 can reduce a number of required pixel value calculations or comparisons. Based on the locations and sizes of the windows, VCA circuit 408 may complete the motion vectors computation of windows ahead of the last row of the image frame.

FIG. 8 is a diagram of aggregated sums of blocks of an image, according to one embodiment. In aggregation mode, the statistics circuit 402 accumulates column sums and row sums for each block of a window. Further, the statistics circuit 402 aggregates the row sums of the blocks for the window. In the example shown in FIG. 8, the statistics circuit 402 aggregates row sums 804A, 804B, 804C, and 804D to generate vector 806 representing an aggregated row sum of a window. The statistics circuit 402 also aggregates the column sums of the blocks for the window. For instance, the statistics circuit 402 aggregates column sums 808A, 808B, 808C, and 808D to generate vector 810 representing an aggregated column sum of a window.

For a given window, the VCA circuit 408 determines a first cross-correlation score 808 in the vertical correlation direction and a second cross-correlation score 814 in the horizontal correlation direction. The VCA circuit 408 determines the cross-correlation score 808 by cross-correlating vector 806 and reference vector 816, which is determined using an aggregate row sum in the prior image. The VCA circuit 408 determines the cross-correlation score 814 by cross-correlating vector 810 and reference vector 812, which is determined using an aggregate column sum in the prior image. The VCA circuit 408 generates a motion vector for the window of the current image using the pair of cross-correlation scores 814 and 808. Particularly, the cross-correlation score 814 represents amount of horizontal shift and the cross-correlation score 808 represents amount of vertical shift detected by the motion estimator 305 across the blocks in the window.

The VCA circuit 408 may determine whether to use sub-window mode or aggregation mode case-by-case based on characteristics of a given image. For example, sub-window mode is used to estimate local motion at the sub-window (or window) locations, while aggregation mode is used to estimate global motion. Relative to a motion vector in sub-window mode, a motion vector in aggregation mode covers a larger field (e.g., number of rows or columns of pixels), and thus may include additional image features. In embodiments where one or more images show a moving object, the VCA circuit 408 may determine to use sub-window mode to target motion estimation on the moving object. In other embodiments, the VCA circuit 408 may determine to use aggregation mode to estimate global motion of the camera that captured processed images.

Example Autofocusing

Figure 9:
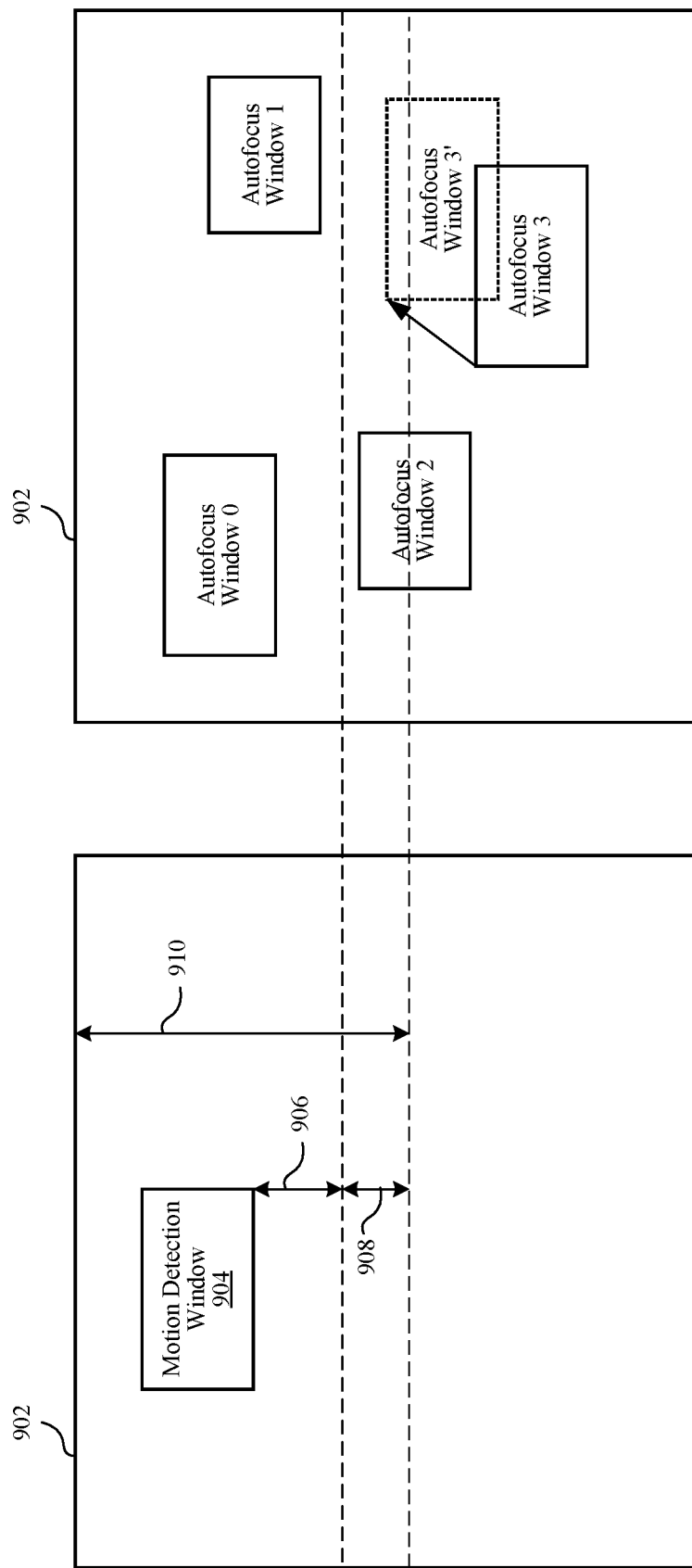
FIG. 9 is a diagram of autofocus windows, according to one embodiment.

FIG. 9 is a diagram of autofocus windows, according to one embodiment. In the illustrated example, the statistics circuit 402 generates image statistics of motion detection window 904 of image 902. Additionally, the VCA circuit 408 uses the image statistics to generate a motion vector of the motion detection window 904, e.g., using the processes described above with respect to FIGS. 6 through 8.

In various embodiments, the motion estimator 305 processes pixels in a (e.g., raster) left-to-right and top-to-bottom manner, e.g., when accumulating sums of pixel values of rows or columns. An amount of time is required for the motion estimator 305 to execute steps for determining motion vectors of windows in images. The threshold vertical location (or coordinate) 910 shown in FIG. 9 indicates the amount of time required to determine the motion vector of the motion detection window 904. The amount of time includes 906, which is the time to determine the motion vectors based on window 904, of the statistics circuit 402 and/or the VCA circuit 408. The amount of time may be based on coordinate position or size of the motion detection window 904. For instance, due to the top-to-bottom processing order, windows toward the bottom of the image 902 will require a greater amount of time, relative to windows toward the top of the image 902. The motion estimator 305 may account for a threshold vertical shift 908 as part of the threshold vertical location 910. In some embodiments, the threshold vertical shift 908 indicates a greatest allowable shift of an autofocus window in the vertical direction. If a vertical location of an auto focus window is on or after the threshold vertical location 910, it is considered that the motion detection window 904 is followed by the auto focus window after at least a threshold vertical distance. The threshold vertical distance may be used to determine whether to perform autofocusing, which is further described below with respect to FIG. 11.

The following description refers to the CPU 208 of a device 100 performing autofocus of the example image 902. Though, in other embodiments, another processor or computing device may perform the autofocusing by implementing any combination of software, hardware, or firmware. The CPU 208 may perform autofocusing on one or more autofocus windows such as autofocus windows 0, 1, 2, and 3 shown in FIG. 9. In particular, the CPU 208 determines whether a given autofocus window is suitable of being shifted for autofocusing by determining whether the motion detection window 904 is followed by a given autofocus window by at least the threshold vertical distance. As illustrated in FIG. 9, vertical locations of autofocus windows 0, 1, and 2 are within the threshold vertical location 910. Therefore, it may be determined that the autofocus windows 0, 1, and 2 follow the motion detection window 904 within the threshold vertical distance.

The CPU 208 can perform autofocusing on autofocus window 3 if it is determined that the motion detection window 904 is followed by autofocus window 3 by at least the threshold vertical location 910. The CPU 208 may perform autofocusing by shifting autofocus window 3 to a modified position, as indicted by autofocus window 3'. The CPU 208 determines a horizontal and vertical distance to shift the autofocus window 3 based on the motion vector of the motion detection window 904. For example, the CPU 208 retrieves motion vector values from a register, where the motion vector values indicate amounts to shift based on cross-correlation scores in the horizontal and vertical directions. As illustrated in FIG. 9, the autofocus window 3' may overlap a portion of the threshold vertical location 910. In some embodiments, since the threshold vertical location 910 accounts for a threshold vertical shift 908, the CPU 208 may shift an autofocus window upwards in the vertical direction by an amount no greater than the threshold vertical shift 908.

Example Process Flows

Figure 10:
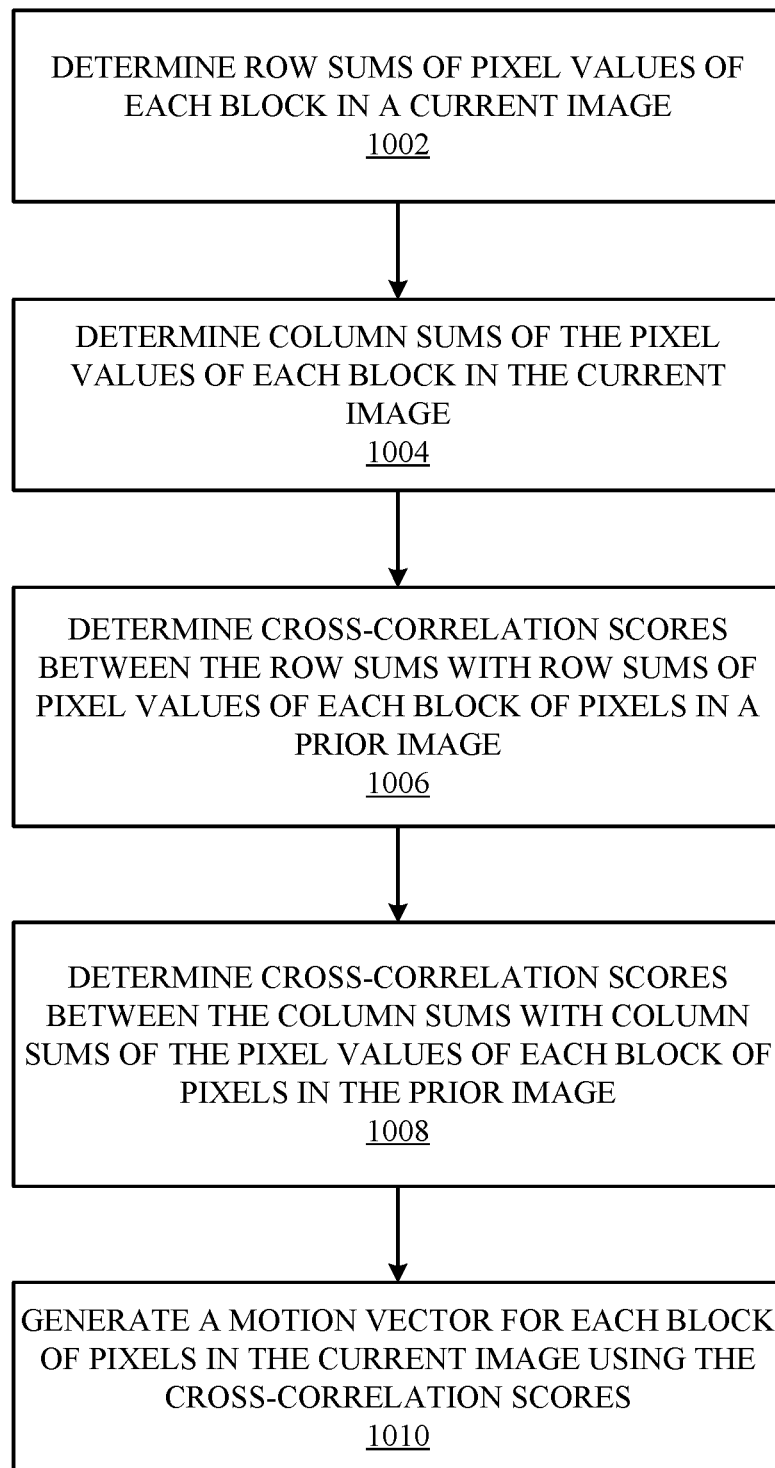
FIG. 10 is a flowchart illustrating a method of generating a motion vector, according to one embodiment.

FIG. 10 is a flowchart illustrating a method of generating a motion vector, according to one embodiment. Some embodiments may include different and/or additional steps, or perform the steps in different orders.

In one embodiment, the statistics circuit 402 determines 1002 row sums of pixel values of each block of pixels in (e.g., an motion detection window of) a current image. The statistics circuit 402 determines 1004 column sums of the pixel values of each block of pixels in the current image. In some embodiments, the statistics circuit 402 may perform the steps 1002-1004 in parallel for multiple color components or blocks of an input image. In some embodiments, the statistics circuit 402 determines row sums and column sums in an aggregation mode, for example, where pixel values are accumulated over adjacent pixels or blocks.

The VCA circuit 408 determines 1006 first cross-correlation scores between the row sums of the pixel values of each block of pixels in the current image with row sums of pixel values of each block of pixels in a prior image preceding the current image. The VCA circuit 408 determines 1008 second cross-correlation scores between the column sums of the pixel values of each block of pixels in the current image with column sums of the pixel values of each block of pixels in the prior image. Vectors of the current image may be greater in size than vectors of the prior image. For example, the row (or column) sums of the current image, or of the prior image, or both, may be cropped.

The VCA circuit 408 Generates 1010 a motion vector for each block of pixels in the current image, e.g., by identifying a vertical shift corresponding to a greatest one of the first cross-correlation scores and a horizontal shift corresponding to a greatest one of the second cross-correlation scores. The motion vector may be stored in a register (e.g., for later retrieval for performing autofocusing) or output to another component such as a processor or memory of a corresponding device 100.

Figure 11:
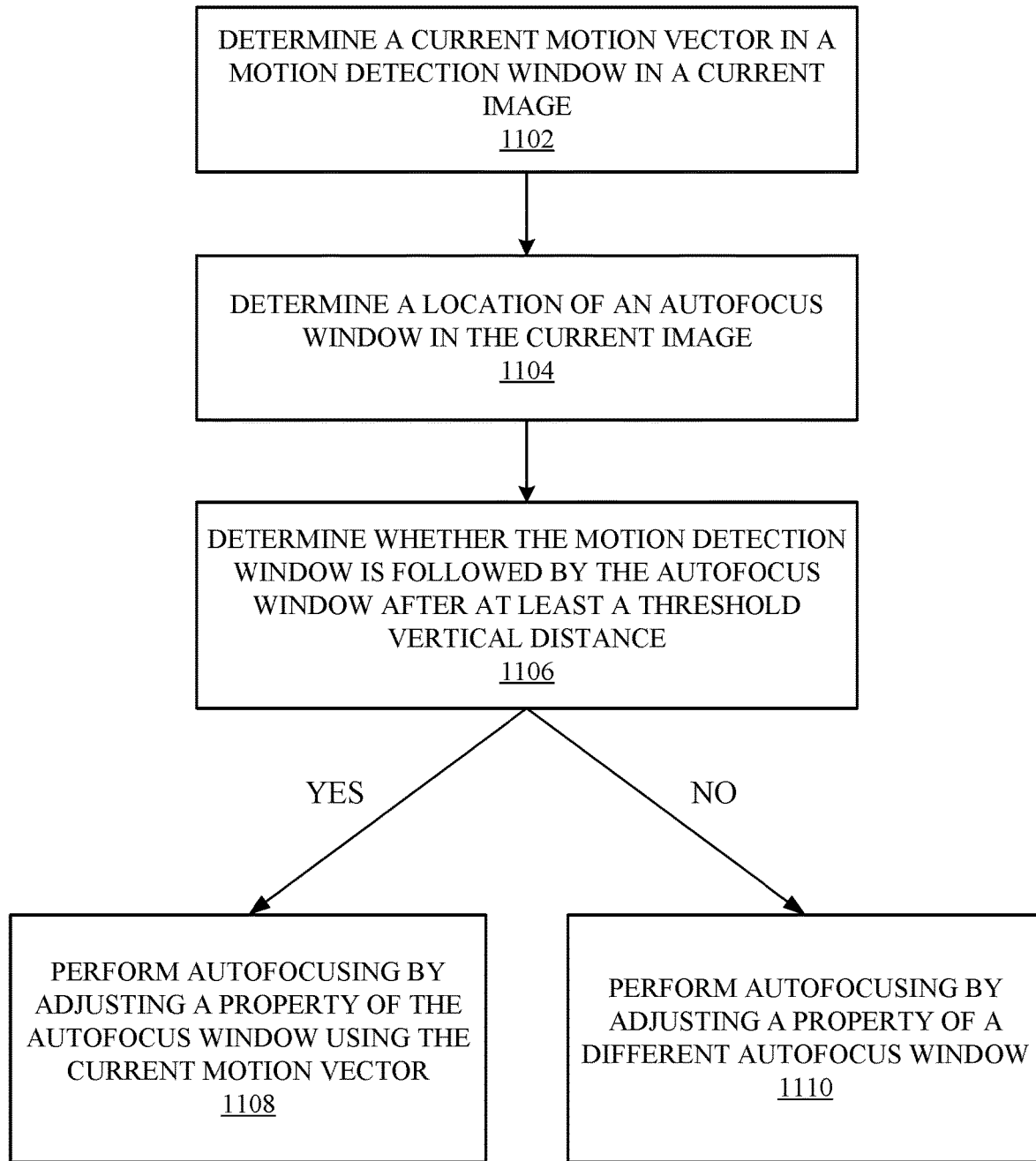
FIG. 11 is a flowchart illustrating a method of performing autofocusing, according to one embodiment.

FIG. 11 is a flowchart illustrating a method of performing autofocusing, according to one embodiment. Some embodiments may include different and/or additional steps, or perform the steps in different orders.

In one embodiment, a device 100 determines 1102 a current motion vector of a motion detection window in a current image. The current motion vector of the motion detection window may be determined by the motion estimator 305 using the process shown in FIG. 10. The motion detection window may have dimensions that are multiples of two, and may have a dimension of at least eight pixels in width and height. In some embodiments, current motion vectors may be determined for multiple motion detection windows (e.g., up to eight by eight) in a given image.

The CPU 208 of the device 100 determines 1104 a horizontal location and a vertical location of an autofocus window in the current image. For instance, as shown in of FIG. 9, the 2D image 902 includes multiple autofocus windows each having a different horizontal and vertical location, e.g., coordinates in the X and Y axis. The CPU 208 determines 1106 whether the motion detection window is followed by the autofocus window after at least a threshold vertical distance, where the threshold vertical distance accounts for at least a period of time for determining the current motion vector. In some embodiments, the CPU 208 selects the autofocus window from a set of multiple autofocus windows. Referring to the example shown in FIG. 9, the CPU 208 may select autofocus window 3 from the other autofocus windows 0, 1, and 2, if it is determined that autofocus window 3 is outside of the threshold vertical location 910. In other embodiments, the CPU 208 may process up to sixteen or more autofocus windows for a given image.

If it is determined that the motion detection window is followed by the autofocus window after at least the threshold vertical distance, the CPU 208 performs autofocusing 1108 by adjusting at least one property of the autofocus window using the current motion vector. The property of the autofocus window may include a location, shape, size, or orientation of the autofocus window. For example, the CPU 208 may shift the horizontal of location of the autofocus window by a horizontal element of the current motion vector. Additionally, the CPU 208 may shift the vertical location of the autofocus window by a vertical element of the current motion vector. The CPU 208 may shift the location of the autofocus window along a vertical axis by an amount less than or equal to a threshold vertical shift, and along a horizontal axis by an amount less than or equal to a threshold horizontal shift. The threshold vertical shift and threshold horizontal shift may each be a multiple of two. In some embodiments, the shifted location of the autofocus window overlaps within the threshold vertical location 910 (as shown in the example of FIG. 9). In other embodiments, adjusting the at least one property includes one or more of: rotating the autofocus window by a certain degree, modifying a shape of the autofocus window (e.g., from a square to a different type of quadrilateral or polygon), or increasing or decreasing a size of the autofocus window.

In some embodiments, if it is determined that the motion detection window is followed by the autofocus window within the threshold vertical distance, the CPU 208 performs autofocusing 1110 by adjusting at least one property of a different autofocus window using a motion vector corresponding to the different autofocus window. For example, in the embodiment shown in FIG. 9, the CPU 208 may perform AF statistics based on un-shifted autofocus windows 0, 1, or 2, and based on shifted autofocus window 3. The at least one property may include any of the example properties described above.

In other embodiments, if it is determined that the motion detection window is followed by the autofocus window within the threshold vertical distance, the CPU 208 generates a signal indicating that the current motion vector is not to be used for performing autofocusing on the autofocus window, e.g., to avoid back pressure on the VCA circuit 408 or for read/write operations via DMA. The signal may be an interrupt, which occurs after processing of a given autofocus window, rather than at the end processing of an image frame. The CPU 208 may generate an interrupt or signal for each active autofocus window of the image.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. A method comprising:
   determining a current motion vector of a motion detection window in a current image;
   determining a location of an autofocus window in the current image;

determining whether the motion detection window is followed by the autofocus window after at least a threshold vertical distance based on the location of the autofocus window, the threshold vertical distance accounting for at least a period of time for determining the current motion vector; and responsive to determining that the motion detection window is followed by the autofocus window after at least the threshold vertical distance, adjusting at least one property of the autofocus window according to at least the current motion vector.

2. The method of claim 1, wherein adjusting the at least one property of the autofocus window includes:

shifting a horizontal or vertical location of the autofocus window by a horizontal element or vertical element of the current motion vector, respectively.

3. The method of claim 1, wherein the at least one property of the autofocus window includes the location, a shape, a size, or an orientation of the autofocus window.

4. The method of claim 1, further comprising:

responsive to determining that the motion detection window is followed by the autofocus window within the threshold vertical distance, generating a signal indicating that the current motion vector is not to be used for performing autofocusing on the autofocus window.

5. The method of claim 1, further comprising:

responsive to determining that the motion detection window is followed by the autofocus window within the threshold vertical distance, performing autofocusing on a different autofocus window using another motion vector corresponding to the different autofocus window.

6. The method of claim 1, wherein the current motion vector is determined by comparing pixel values in blocks of pixels in the current image and pixel values in blocks of pixels in a prior image preceding the current image.

7. The method of claim 6, wherein comparing the pixel values in blocks of pixels in the current image and the pixel values in blocks of pixels in the prior image comprises:

determining first cross-correlation scores of row sums of pixel values in each row of the blocks of pixels in the current image with row sums of pixel values in each row of the blocks of pixels in the prior image; and determining second cross-correlation scores of column sums of pixel values in each column of the blocks of pixels in the current image with column sums of pixel values in each column of the blocks of pixels in the prior image.

8. The method of claim 7, wherein the current motion vector is further determined by:

identifying a vertical shift corresponding to a greatest one of the first cross-correlation scores; and identifying a horizontal shift corresponding to a greatest one of the second cross-correlation scores, wherein the location of the autofocus window is shifted by the horizontal shift and the vertical shift.

9. The method of claim 1, wherein the threshold vertical distance further accounts for a threshold vertical shift and coordinates of the motion detection window in a vertical axis.

10. The method of claim 9, wherein the shifted location of the autofocus window overlaps within the threshold vertical distance, and wherein the location of the autofocus window is shifted less than or equal to the threshold vertical shift along the vertical axis.

11. The method of claim 9, wherein the threshold vertical shift and a threshold horizontal shift of the autofocus window are each a multiple of a power of two.

12. The method of claim 1, further comprising:

selecting the autofocus window from a plurality of autofocus windows, each of the plurality of autofocus windows having a different location in the current image.

13. A non-transitory computer-readable storage medium storing instructions for image processing, the instructions when executed by a processor causing the processor to:

determine a current motion vector of a motion detection window in a current image;

determine a location of an autofocus window in the current image;

determine whether the motion detection window is followed by the autofocus window after at least a threshold vertical distance based on the location of the autofocus window, the threshold vertical distance accounting for at least a period of time for determining the current motion vector; and responsive to determining that the motion detection window is followed by the autofocus window after at least the threshold vertical distance, adjusting at least one property of the autofocus window according to at least the current motion vector.

14. The non-transitory computer-readable storage medium of claim 13, wherein adjusting the at least one property of the autofocus window includes:

shifting a horizontal or vertical location of the autofocus window by a horizontal element or vertical element of the current motion vector, respectively.

15. The non-transitory computer-readable storage medium of claim 13, wherein the at least one property of the autofocus window includes the location, a shape, a size or an orientation of the autofocus window.

16. The non-transitory computer-readable storage medium of claim 13, the instructions when executed by the processor causing the processor to:

responsive to determining that the motion detection window is followed by the autofocus window within the threshold vertical distance, generate a signal indicating that the current motion vector is not to be used for performing autofocusing on the autofocus window.

17. The non-transitory computer-readable storage medium of claim 13, the instructions when executed by the processor causing the processor to:

responsive to determining that the motion detection window is followed by the autofocus window within the threshold vertical distance, perform autofocusing on a different autofocus window using another motion vector corresponding to the different autofocus window.

18. The non-transitory computer-readable storage medium of claim 13, wherein the current motion vector is determined by comparing pixel values in blocks of pixels in the current image and pixel values in blocks of pixels in a prior image preceding the current image.

19. The non-transitory computer-readable storage medium of claim 18, wherein comparing the pixel values in blocks of pixels in the current image and the pixel values in blocks of pixels in the prior image comprises:

determining first cross-correlation scores of row sums of pixel values in each row of the blocks of pixels in the current image with row sums of pixel values in each row of the blocks of pixels in the prior image; and determining second cross-correlation scores of column sums of pixel values in each column of the blocks of pixels in the current image with column sums of pixel values in each column of the blocks of pixels in the prior image.

20. The non-transitory computer-readable storage medium of claim 19, wherein the current motion vector is further determined by:
  identifying a vertical shift corresponding to a greatest one of the first cross-correlation scores; and
  identifying a horizontal shift corresponding to a greatest one of the second cross-correlation scores, wherein the location of the autofocus window is shifted by the horizontal shift and the vertical shift.

\* \* \* \* \*